US 9,155,247 B1

(12) United States Patent
Force

(10) Patent No.: US 9,155,247 B1
(45) Date of Patent: Oct. 13, 2015

(54) MOBILE PLATFORM BASED BIOMASS POWERED HARVESTER

(71) Applicant: Jason Force, Clifton, VA (US)

(72) Inventor: Jason Force, Clifton, VA (US)

( * ) Notice: Subject to any disclaimer, the term of this patent is extended or adjusted under 35 U.S.C. 154(b) by 77 days.

(21) Appl. No.: 14/164,183

(22) Filed: Jan. 25, 2014

Related U.S. Application Data

(60) Provisional application No. 61/769,689, filed on Feb. 26, 2013.

(51) Int. Cl.
| C10L 5/36 | (2006.01) |
| A01D 43/00 | (2006.01) |
| A01D 34/00 | (2006.01) |
| A01D 43/06 | (2006.01) |
| A01D 43/08 | (2006.01) |

(52) U.S. Cl.
CPC .............. *A01D 43/00* (2013.01); *A01D 34/008* (2013.01); *A01D 43/003* (2013.01); *A01D 43/006* (2013.01); *A01D 43/06* (2013.01); *A01D 43/086* (2013.01); *Y02E 50/30* (2013.01); *Y10S 901/01* (2013.01)

(58) Field of Classification Search
CPC ......... Y02E 50/30; Y02E 50/10; Y02E 50/14; Y02E 50/15; Y02E 50/17; C10L 5/44; C10L 5/363; C10L 5/361; C10L 5/40; C10L 5/445; C10L 9/08; A01D 82/00
USPC ........... 44/589, 605, 596, 550, 629, 634, 307, 44/563, 594; 34/282; 56/1
See application file for complete search history.

(56) References Cited

U.S. PATENT DOCUMENTS

| 3,664,097 A | 5/1972 | Pedigo |
| 4,964,265 A | 10/1990 | Young |
| 5,794,560 A | 8/1998 | Terenzi |
| 6,336,449 B1 | 1/2002 | Drisdelle et al. |
| 7,877,970 B1 | 2/2011 | Crosby |
| 8,074,935 B2 | 12/2011 | Gryniewski |
| 8,157,032 B2 | 4/2012 | Gettings |
| 8,256,542 B2 | 9/2012 | Couture |
| 8,281,584 B2 | 10/2012 | Weber |
| 2006/0130396 A1 | 6/2006 | Werner |

(Continued)

OTHER PUBLICATIONS

Finkelstein, Brief Project Overview EATR™: Energetically Autonomous Tactical Robot, Robot, http://www.robotictechnologyinc.com/images/upload/file/Presentation%20EATR%20Brief%20Overview%202013%20June%2010.pdf, Jun. 13, 2010.

(Continued)

*Primary Examiner* — Árpád Fábián-Kovács
(74) *Attorney, Agent, or Firm* — David G. Grossman

(57) ABSTRACT

A mobile platform based biomass powered harvester has a header, a biomass processor, a heated storage container, a guidance system, a biomass gasification reactor, a syngas engine, an electric generator, and a guidance system. The header harvests biomass. The biomass processor includes a shredder, a press, a dryer, and a densifier. The densifier compacts the biomass into a multitude of compressed biomass pieces. The heated storage container receives compressed biomass pieces from the biomass processor. The guidance system guides the mobile platform at a speed determined by the operating capacity of the densifier. The biomass gasification reactor generates syngas from compressed biomass pieces. The syngas engine generates shaft power. The electrical generator converts the shaft power to electricity to power the guidance system.

20 Claims, 10 Drawing Sheets

(56) References Cited

U.S. PATENT DOCUMENTS

| | | |
|---|---|---|
| 2007/0084385 A1 | 4/2007 | Lana et al. |
| 2007/0219666 A1 | 9/2007 | Filippov |
| 2008/0185336 A1 | 8/2008 | Maekawa |
| 2009/0090282 A1 | 4/2009 | Gold |
| 2009/0314554 A1 | 12/2009 | Couture |
| 2010/0106344 A1 | 4/2010 | Edwards |
| 2010/0155156 A1 | 6/2010 | Finkelstein |
| 2010/0281767 A1 | 11/2010 | Zeeck |

OTHER PUBLICATIONS http://www.robotictechnologyinc.com/index.php/EATR.

Brief Project Overview Robotic Technology Inc., EATR: Energetically Autonomous Tactical Robot, http://www.robotictechnologyinc.com/images/upload/file/Overview%20Of%20EATR%20Project%20Brief%206% 20April %2009.pdf.

Solar Research Institute, Handbook of Biomass Downdraft Gasifier Engine Systems, Solar Technical Information Program, 1617 Cole Boulevard, Golden, Colorado 80401-3393, Mar. 1988.

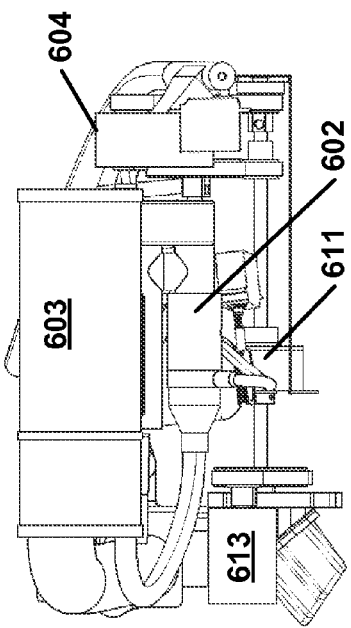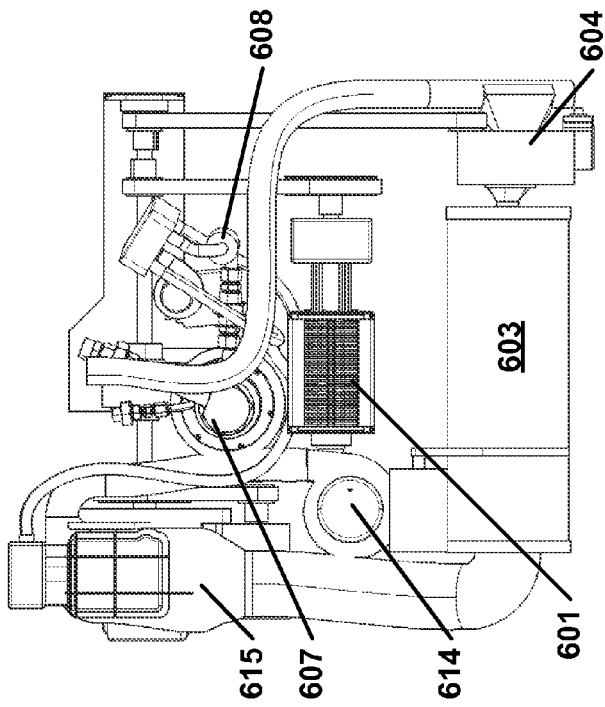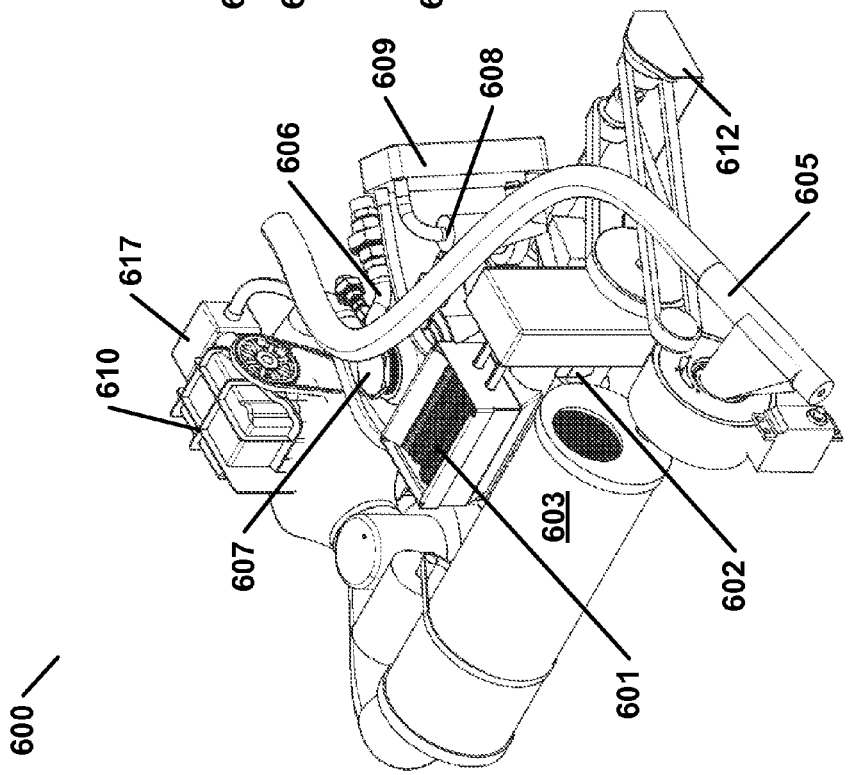
FIG. 6B
FIG. 6C
FIG. 6A

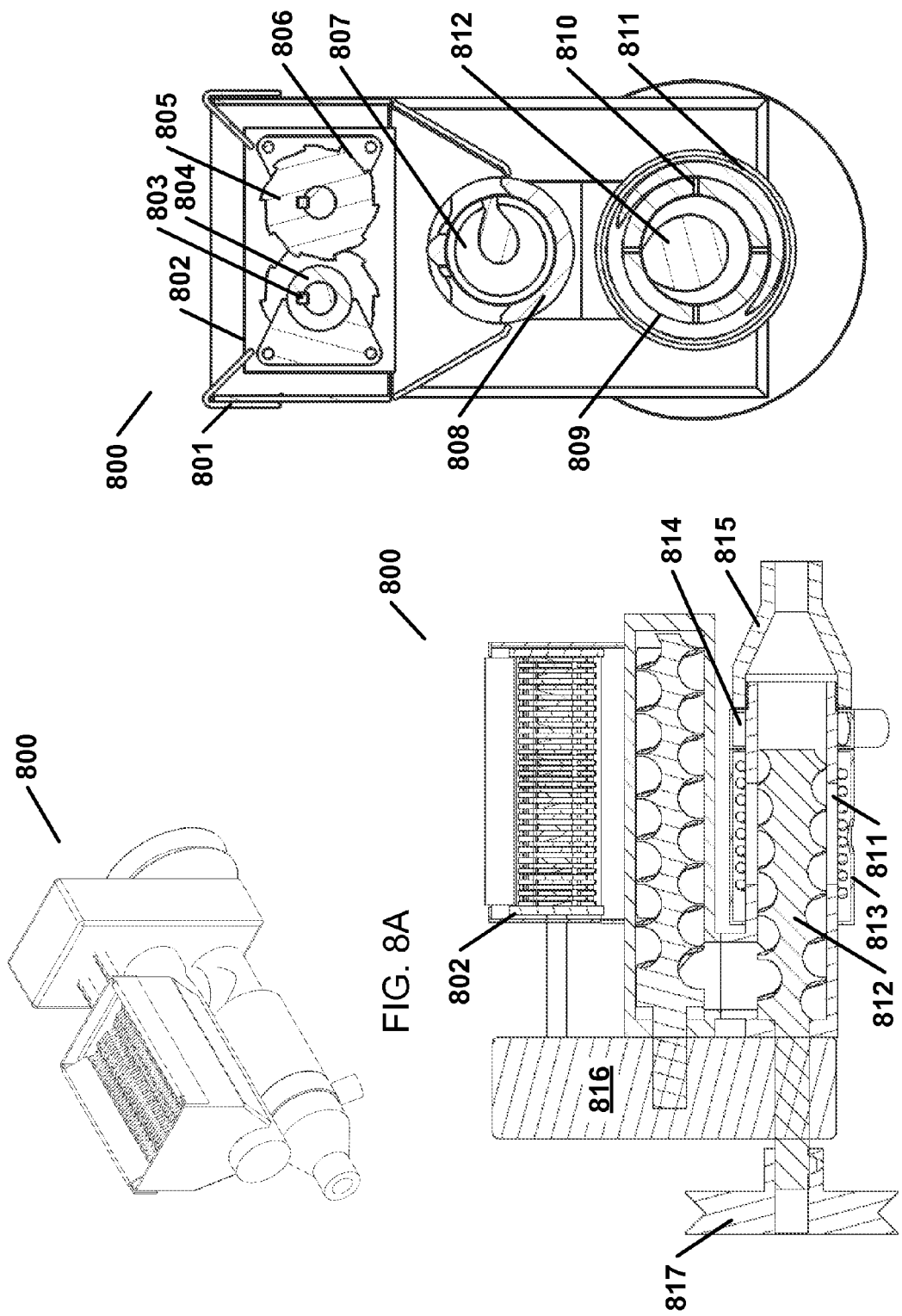

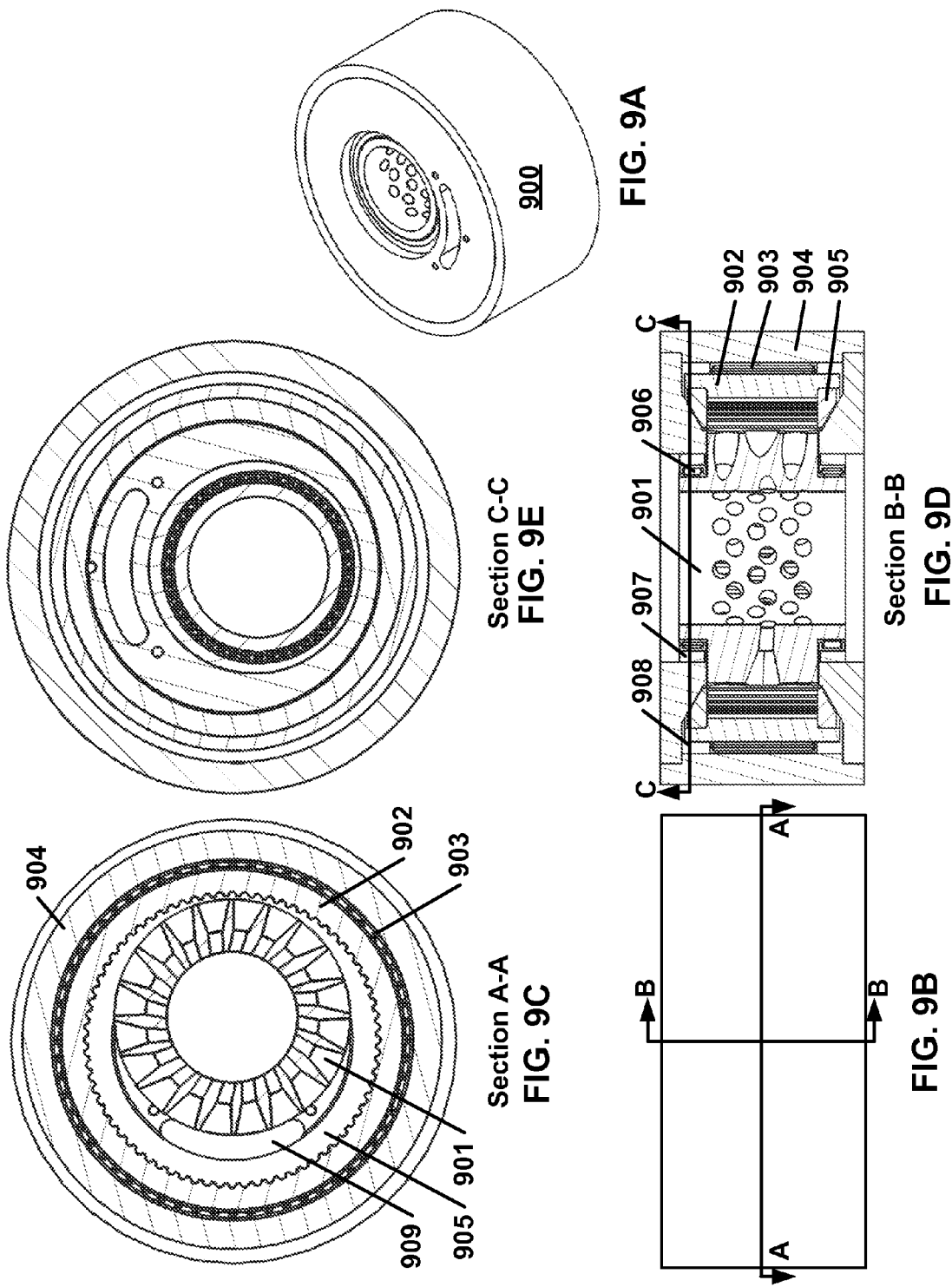

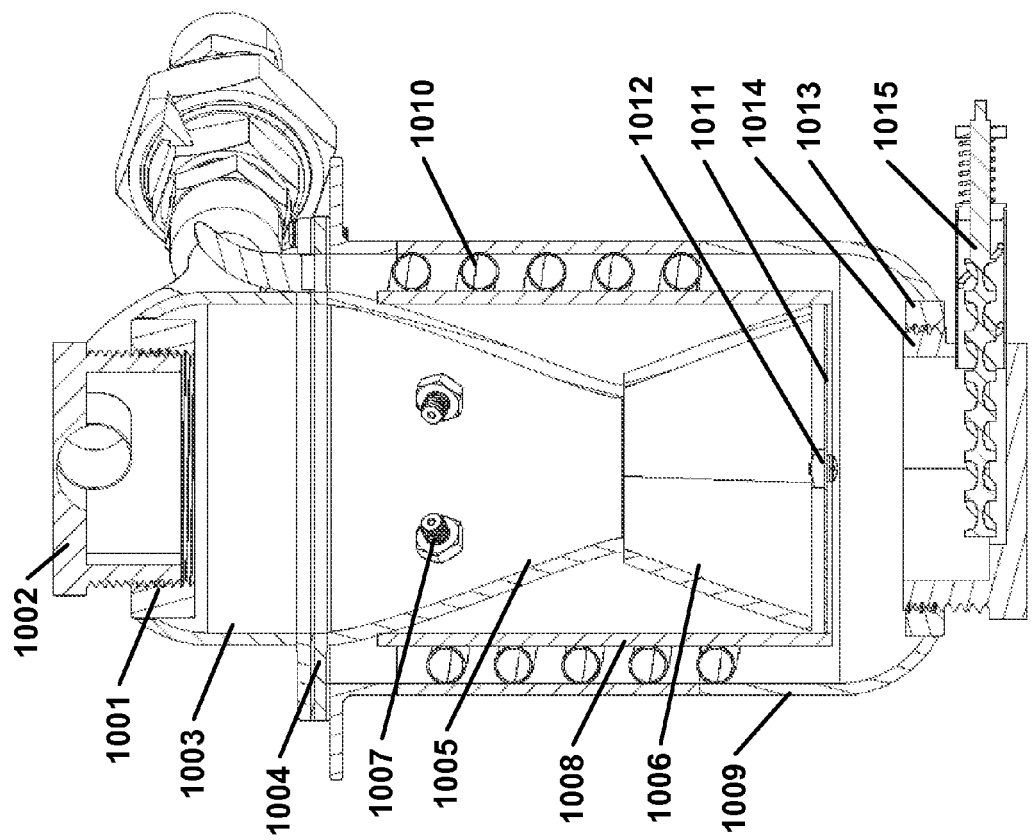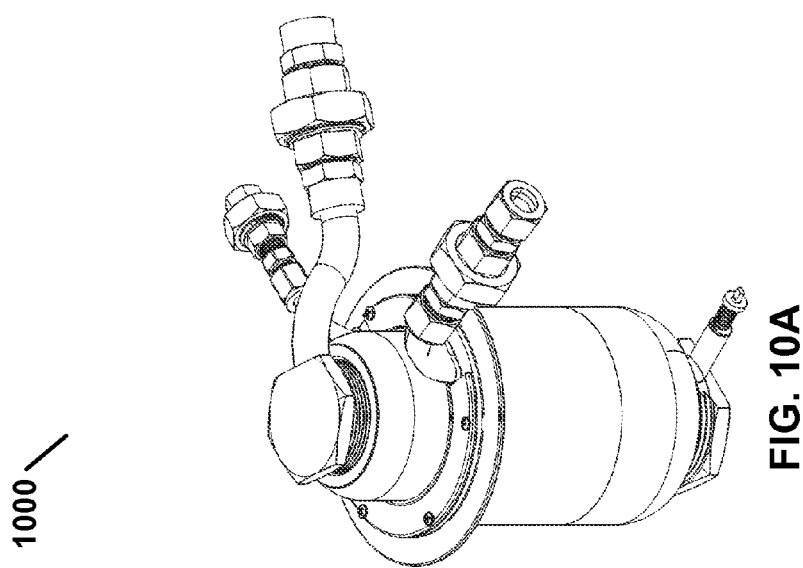

MOBILE PLATFORM BASED BIOMASS POWERED HARVESTER

CROSS-REFERENCE TO RELATED APPLICATIONS

This application claims the benefit of U.S. Provisional Application No. Appl. No. 61/769,689, filed Feb. 26, 2013, entitled "Self-fueling Lawn Harvester," which is hereby incorporated by reference in its entirety.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIGS. 6A, 6B and 6C are illustrations of an aspect of an embodiment of a mobile platform based biomass powered harvester.

FIGS. 8A, 8B and 8C are illustrations of an example shredder/press as per an aspect of an embodiment of the present invention.

FIGS. 9A, 9B, 9C, 9D, and 9E are illustrations of an example pelletizer as per an aspect of an embodiment of the present invention.

FIGS. 10A and 10B are illustrations of an example biomass gasification reactor as per an aspect of an embodiment of the present invention.

DETAILED DESCRIPTION OF THE INVENTION

Embodiment of the present invention comprise a mobile platform based biomass powered harvester. Some of the various embodiments employ a mower and grass pellet harvester that harvests and processes grassy biomass into a dried pellet form. Some of the dried pellet(s) may be used to fuel the harvester. Additional dried pellets may be used for other applications such as heating or power generation.

Figure 1A:
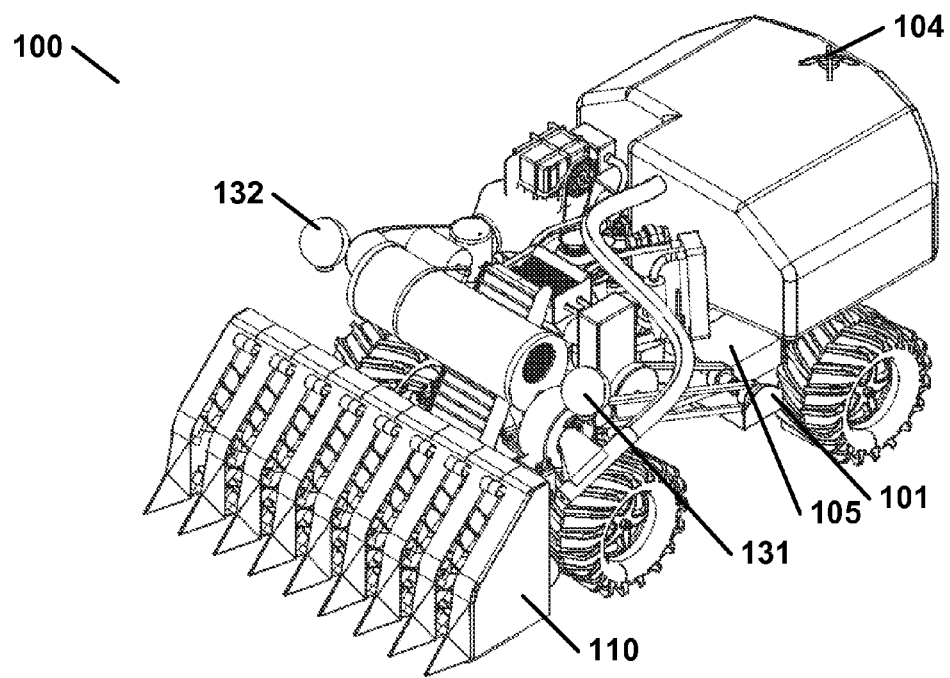
FIGS. 1A and 1B are diagrams of an example mobile platform based biomass powered harvester as per an embodiment of the present invention.
Figure 1B:
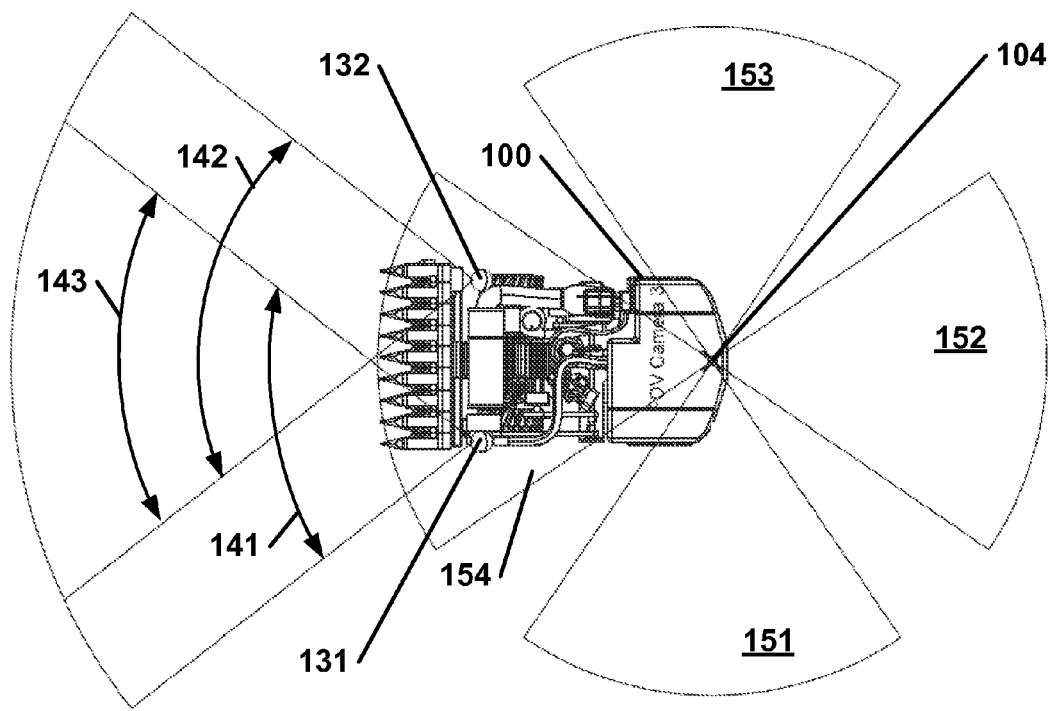

FIG. 1A and FIG. 1B are diagrams of an example embodiment of a mobile platform based biomass powered harvester 100. A cutting header 110 may be mounted forward of a front axle of mobile platform based biomass powered harvester 101. The header 110 may be configured to harvest biomass by delivering cut crop pieces to a shredder through an elevator. The header 110 may have articulation to follow the ground. The header may retract to vary the cut height and allow for higher ground clearance when not cutting.

The mobile platform based biomass powered harvester 100 may include a mobility platform/package 101 comprising at least a chassis, a transmission, and wheels. A mobility package 101 may be required for mobile operation, but one skilled in the art will recognize that there may be a variety of various mobility package 101 implementations. Various embodiments of mobility packages 101 may be configured differently depending on factors such as the terrain the mobile package may operate on, biomass to be harvested, manufacturer preferences, and/or the like. For example: a mobile platform based biomass powered harvester 100 configured to collect algae may employ an amphibious mobility package 101, a mobile platform based biomass powered harvester 100 configured to collect sea weed may employ a submersible mobility package 101, and a mobile platform based biomass powered harvester 100 configured to collect grain may employ a ground traveling mobility package 101.

Some of the various embodiments of the mobile platform based biomass powered harvester 100 may include cameras 131, 132 and 104 to assist in navigation and control. As shown in the illustrated examples, two forward cameras 131 and 132 may be employed. As shown, each of these forward cameras 131 and 132 have an overlapping field of view 143 and separate fields of view 141 and 142 respectively. These cameras 131 and 132 may also pan and tilt to give a better view of the surrounding environment and assist in operations such as, but not limited to, docking the mobile platform based biomass powered harvester and/or depositing processed biomass fuel. During normal cutting operations, the area with an overlapping field of view 143 may allow for stereo depth perception. This depth perception capability may be employed in obstacle and terrain analysis, as well as in making determinations of crop type and suitability.

Similarly, the mobile platform based biomass powered harvester 100 may include one or more omnidirectional cameras (e.g. camera 104) with a nearly continuous and/or variable peripheral field of view(s) 151, 152, 153, and 154. An example embodiment of this view type may be to use a camera 104 with a cone lens, and then post-process a digital image from camera 104 to correct for lens effects. The omnidirectional camera(s) 104 may be employed in determining and/or analyzing local geometry and/or in situational awareness capabilities of a control system. Alternatively, the camera(s) 104 may be a multitude of sensors(s) pointing in different directions or sensors(s) that are steerable, either manually or automatically. The camera(s) 104 may be sensitive to a multitude of frequencies such as visible light, infrared light, ultraviolet light, radar frequencies, combinations thereof, and/or the like. Some of these frequencies may be used in the identification of bio materials.

Some of the various embodiments of the mobile platform based biomass powered harvester 100 may include one or more electronics bins 105 to store processor components, sensor interfaces, control systems, support electronics, combinations thereof, and/or the like. Some mobile platform based biomass powered harvester 100 embodiments may include system batter(ies) to provide power for the electronics, engine and reactor start, fans, and other electrically actuated systems. When an alternator is running, batter(ies) may assist in stabilizing bus voltage(s).

Figure 2:
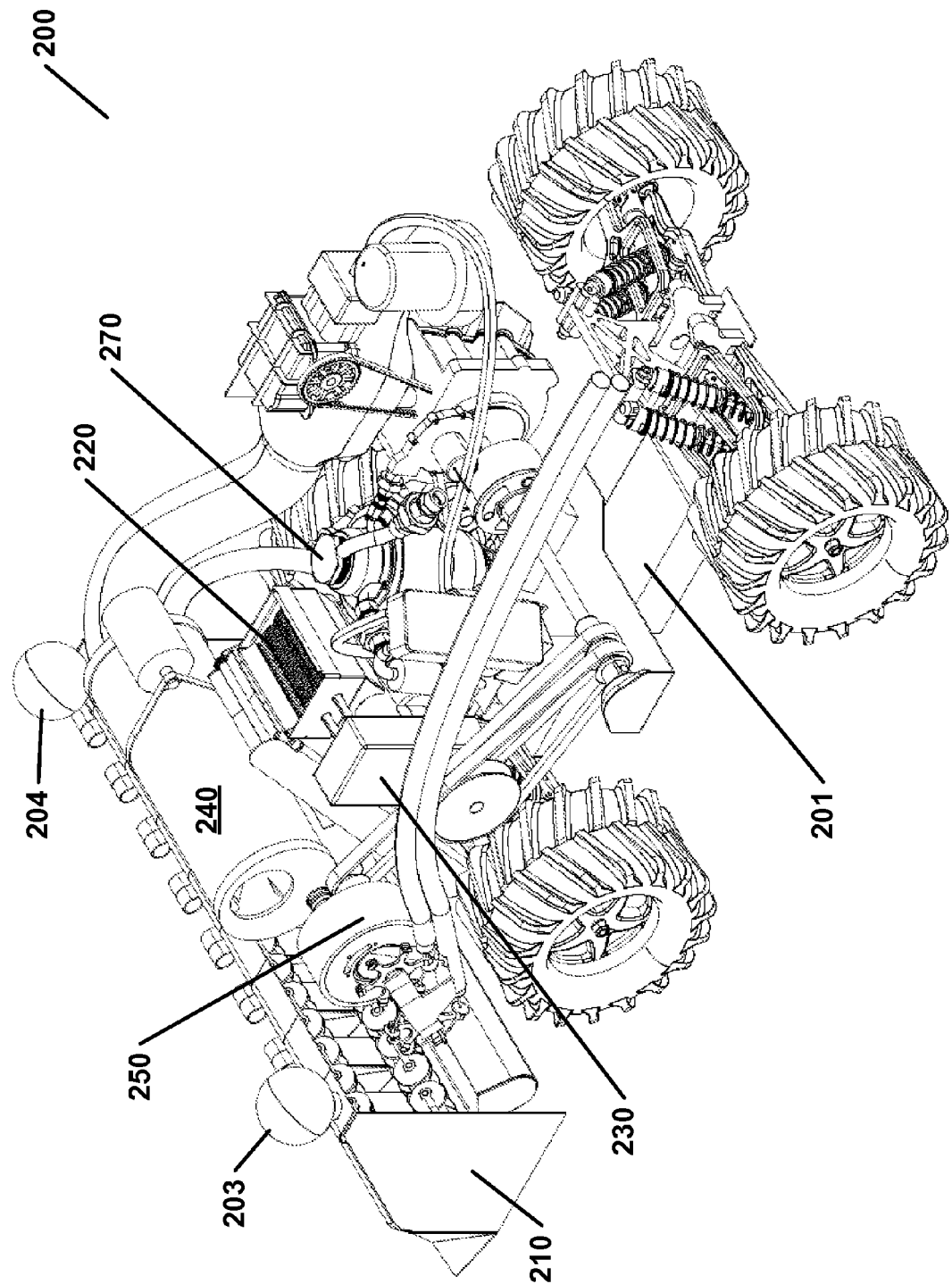
FIG. 2 is a diagram of an aspect of a mobile platform based biomass powered harvester as per an embodiment of the present invention.

FIG. 2 is a diagram of an aspect of a mobile platform based biomass powered harvester 200 as per an embodiment of the present invention. As illustrated, the mobile platform based biomass powered harvester 200 includes a header 210, cameras 203 and 204, a chemical reactor 270, and a biomass processor mounted on a mobility platform 201. As illustrated in this example illustration, the biomass processor includes a shredder 220, a press 230, a dryer 240, and a densifier 250.

Figure 3:
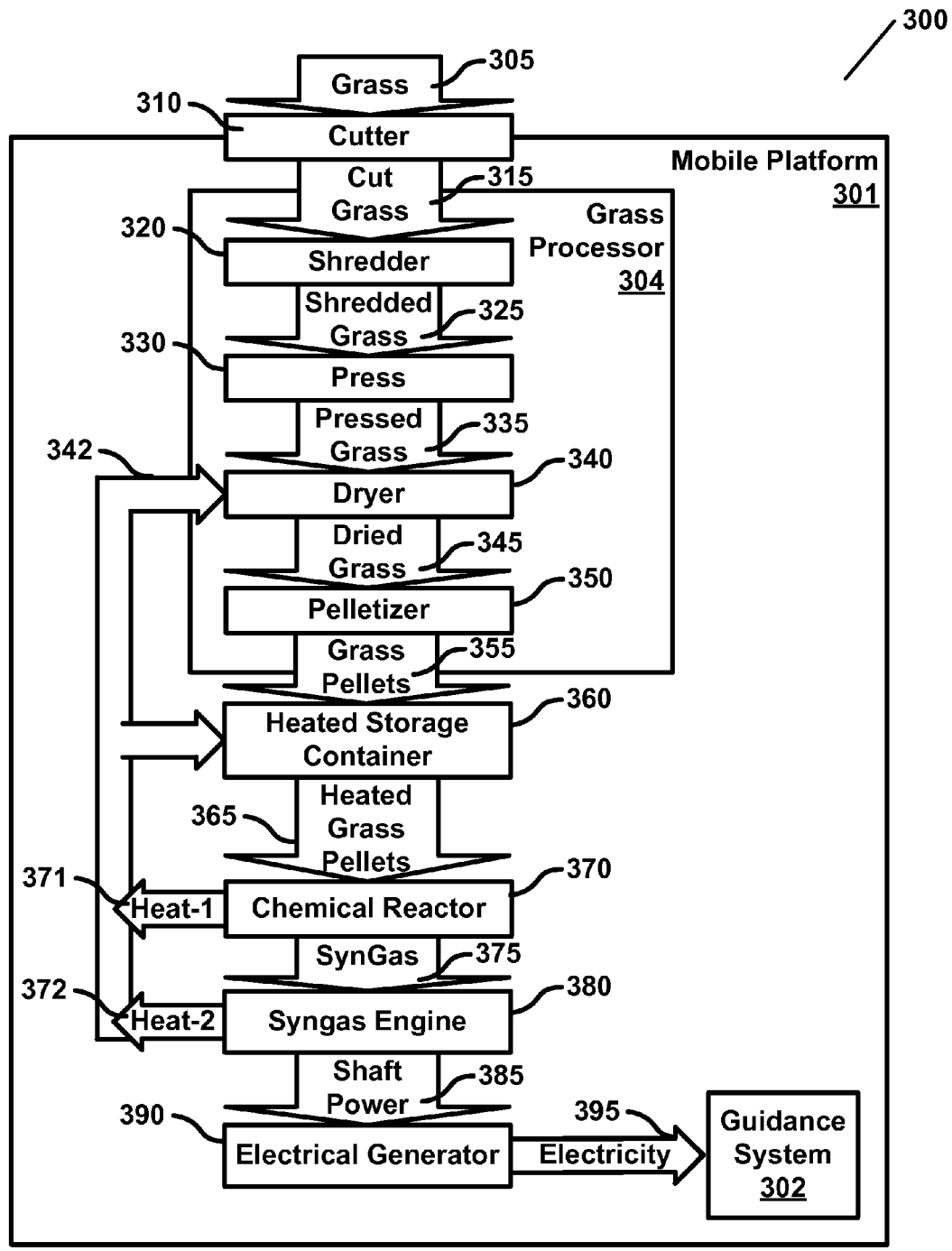
FIG. 3 is a block diagram of an aspect of a mobile platform based grass powered harvester as per an embodiment of the present invention.

According to aspects of various embodiments, FIG. 3 shows a mobile platform 300 based grass powered harvester configured to process grass 305 into grass pellets 355. Some of the various embodiments of the mobile platform 300 comprise a cutter 310, a grass processor 304, a heated storage container 360, a chemical reactor 370, a guidance system 302, a syngas engine 380 and an electrical generator 390. This example configuration may operate in a self-powered mode, where the grass 305 is processed into fuel that powers the mobile platform 300. Embodiments of the grass processor 304 may comprise a shredder 320, a press 330, a rotary dryer 340, and a pelletizer 350. The shredder 320 may be configured to convert the cut grass 315 into shredded grass 325. The press 330 may be configured to produce pressed grass 335 by extracting water from the shredded grass. The rotary dryer 340 may be configured to generate dried grass 345 from the pressed grass. The pelletizer 350 may be configured to compact the dried grass into a multitude of grass pellets 355.

The grass processor 304 may be configured to operate in combination with a heated storage container 360. Heated storage container 360 may store the grass pellets 355. Chemical reactor 370 may be configured to generate syngas 375 by gasifying at least some of the grass pellets 365. Additionally, the chemical reactor 370 may generate a first source of heat 371 for the rotary dryer 340 and/or the heated storage container 360. Excess grass pellets 355 that are not needed as fuel for the chemical reactor 370 may be removed from the heated storage container 360. Removal of excess grass pellets 355 may be performed manually and/or automatically. Automatic removal may involve a removal mechanism attached to the heated storage container 360. The removal mechanism may be controlled by guidance system 302 and/or other suitable controller. In some embodiments, the guidance system 302 may maneuver the mobile platform 301 to specific locations for removal of excess grass pellets 355. According to some of the various embodiments, these removal locations may be predetermined and/or dynamically determined. The guidance system may periodically report the drop locations, either by direct download, by wireless communication, and/or by other communication mechanism known in the art.

The harvester may operate under the control of a guidance system 302 configured to guide the mobile platform 300 at a speed determined by the operating capacity of the pelletizer 350. This speed control capability may be configured to efficiently produce grass pellets 355. It is this speed capability that may enable a unified platform to operate more efficiently than past attempts to generate grass pellets. In the past, separate harvesters were required to cut the grass. This cut grass was then collected by separate vehicles and transported to a processing location. At the separate processing location, the grass was converted to grass pellets by high speed and capacity processing devices. Current embodiments eliminate the intermediate steps of collecting and transporting the cut grass. Additionally, because the embodiments are self-powered, the embodiments can operate for long periods of time autonomously, thus minimizing the constant attention of human operators.

Adjusting the speed of various embodiments may vary depending upon specific biomass being harvested. The harvester may be used to harvest short crops or tall crops, and the crops could have high water content or low water content. The speed of the mobile platform (running on, for example, tracks or wheels) may need to be changed depending on a number of factors relating to the crop and the processing of the crop. These factors may be external such as the biomass density, or internal such as the amount of time required in a dryer for different types of biomass.

An example speed control processes will now be described. According to some embodiments, on approach to a crop, an attempt may be made to classify the type and density using data from sensors such as images from a camera. Crops may also be classified using satellite or remote sensing data. Crops may be classified externally and the information communicated to the harvester. In yet other cases, classification may be performed by a person.

According to some embodiments, predetermined processing information may use the classification information to anticipated system loads in terms of, for example, dry basis biomass and water content. Based on this anticipated load, processing variables may be adjusted such as, for example, platform speed, cutter, press, and/or dryer speed(s). Some embodiments may use a lookup table to determine values for the processing variables. These variables may then be set to operate the platform speed accordingly.

A control loop may be employed to adjust variables as the biomass is being processed. The loop may employ sensor data to verify factors such as platform speed. For example, geometry data from cameras may be employed to verify platform wheel speed.

As biomass is processed, sensors may be employed to change classification and system set points as needed. For example pressure sensors may be employed inside the press to measure chamber pressure for correlation with processing parameters. In yet another example, sensors may be employed inside the dryer to measure moisture content. One way to measure moisture content may be to measure the input/output temperature difference of the biomass entering and exiting the dryer. Some biomass types may require more time in the dryer, requiring a slower system speed.

While guidance has been available in agricultural harvesting equipment, the function of these systems is very basic. The guidance systems are used to help a driver keep equipment steered along pre-planned paths such as aligning the harvester with the same path used in a prior planting step. These systems have no advanced functions like obstacle detection, crop classification, route planning, group task redistribution, or automatic docking. The guide assist is not designed to provide the vehicle with the capability for fully autonomous operation.

While at first glance it may seem reasonable to have a pelleting capability on a mobile harvesting platform, a quick look into the vehicle power math shows that for the pelletizer to keep up with a conventional crop mower, the vehicle would need to produce almost eighteen times the power and would require twenty times the volume to fit the needed shredder, water press, dryer, and pelletizer. While the whole process could be scaled down, the production rate would also scale down. The labor to guide the slow platform plus the high consumption of fuel is prohibitive to the cost of production. However, combining a guidance system capable of fully autonomous operation combined with an onboard pelletizer makes this business concept viable. The high energy use problem is solved by internal generation of fuel derived from the crop itself via a biomass reactor producing syngas. A new business model for generating pelletized biofuel may be enabled by: employing a control system that removes an operator, controlling the platform at a speed adapted to the harvester's ability to pelletize biomass, and generating onboard operating power from the pelletized biomass.

Syngas engine 380 may be configured to generate shaft power 385 and generate a second source of heat 372. The second source of heat 372 may be used by dryer 340 and/or the heated storage container 360 via a heat transfer element 342. An electrical generator 390 may employ the shaft power 385 to produce electricity 395. The electricity 395 may be used to power the guidance system 302 as well as any other electrical devices on the mobile platform such as communication devices, controllers, heaters, solenoids, and/or the like.

Figure 4:
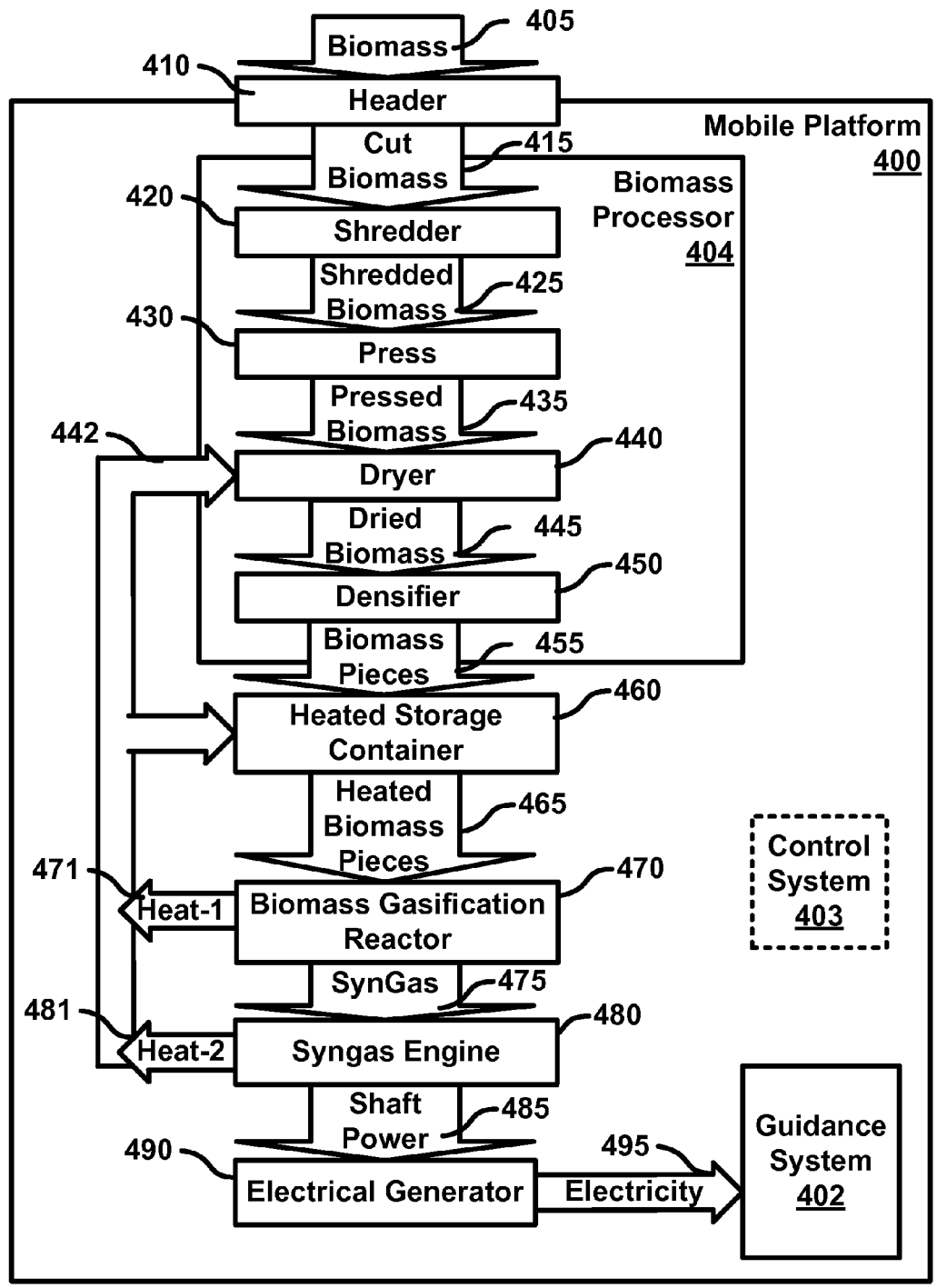
FIG. 4 is a block diagram of an aspect of a mobile platform based biomass powered harvester as per an embodiment of the present invention.

According to aspects of various embodiments, a mobile platform 400 may be configured to process other biomass material besides grass as described above. For example, FIG. 4 illustrates an example mobile biomass powered harvester. This example mobile biomass powered harvester may comprise a mobile platform 400, a header 410, a biomass processor 404, a heated storage container 460, a biomass gasification reactor 470, a syngas engine 480, an electrical generator 490, and a guidance system 402.

The header 410 may be employed to harvest biomass 405 and generate cut biomass 415. According to some of the various embodiments, the header 410 may be configured with various apparatuses dependent upon the particular biomass medium being processed. Examples of particular biomass 405 include grass, weeds, crops, algae, biological material derived from living organisms or from recently living organisms and/or the like types of biomass mediums.

Examples of header apparatuses include, but are not limited to, a frame, a cutter bar, a crushing roll, a pickup cylinder, a pickup reel, a conveyer, an auger, a vacuum, a slicer, tines, a rake bar, an impeller, a pickup device, a knife roll, and/or the like. Examples of cutting bars integrated into a harvester include MacDon FD70 and the SunJoe HJ602 Grass Shear. Another example header for harvesting corn is disclosed in U.S. Pat. No. 8,413,413 to Lohrentz et al. The header may employ, for example, a knife rolls attached to a cutter head to allow a vehicle to harvest grass (or other types of biomass) that are larger than the vehicle itself. Example knife rolls (some embodiments of which are called "corn heads") may comprise cylinders with mounted blades to cut stalks to length. Example knife rolls may be obtained from Oxbo International Corporation of Byron, N.Y.

The biomass processor 404 may comprise a shredder 420, a press 430, a dryer 440, and a densifier 450.

The shredder 420 may be configured to shred the cut biomass 415 into shredded biomass 425. The shredder may be configured to reduce the size of the biomass to be compatible with the densifier as well as to break down biomass cell walls and thereby allow moisture to be removed from the biomass. Some example shredders may be obtained from WEIMA America, Inc. of Fort Mill, S.C.

The press 430 may be configured to generate pressed biomass 435 by extracting water from the shredded biomass 425. According to various embodiments, the press 430 may be, for example, a constant output screw press, a sequential piston-type press and/or the like. Example screw presses may be obtained from Vincent Corporation of Tampa, Fla.

The dryer 440 may be configured to generate dried biomass 445 by drying pressed biomass 435. According to some of the various embodiments, the dryer 440 may be a rotary dryer. The dryer 440 may be configured with an electric heating element, a syngas burner, a heat exchanger, and/or the like. A heat exchanger may be configured to transport external sources of heat 442 into the dryer 440. External sources of heat 442 may include, for example, heat 471 from the biomass gasification reactor 470, heat 481 from the syngas engine 480, and/or the like. The construction of the dryer 440 may be configured to control the moisture content. Additionally, the dryer 440 may be configured to desiccate and/or rotate the biomass. According to some of the various embodiments, dryer 440 may employ an auger configured to move the biomass from a dryer entrance to a dryer exit. Dryer 440 may include at least one moisture exit. For example, dryer 440 may include openings along its length or at either end sized to allow the exit of moisture while containing the shredded biomass. Example rotary dryers may be obtained from Baker-Rullman Manufacturing, Inc. of Watertown, Wis.

The densifier 450 may be configured to compact the dried biomass 445 into a multitude of compressed biomass pieces 455. The densifier 450 may be a pelletizer, a briquetter, an extrusion device and/or the like. According to aspects of various embodiments, the densifer 450 may be configured to compact biomass at a rate that generates more compressed biomass pieces than required to operate the mobile platform 400 based biomass powered harvester. Maintaining this rate may assure that a surplus of biomass pieces 455 are produced. The densifer 450 may extrude biomass pieces 455 in various forms such as pellets, briquettes, and/or the like extrusion elements. Pellet size may vary depending upon intended applications and end-use considerations, but may, for example, range between 1 and 100 millimeters in diameter for certain applications or between 5 and 9 millimeters for other applications. Briquette sizes may vary depending upon the intended application, but may, for example, have a length of between 4 and 300 millimeters. The densifier 450 may be configured to be hosted on the mobile platform 400 and may be constructed to have a weight supportable by mobile platform 400, for example, less than 400 pounds. Example pelletizers may be obtained from MakePellets.com of Wasco, Ill. Example briquette presses may be obtained from WEIMA America, Inc. of Fort Mill, S.C.

The heated storage container 460 may be configured to receive compressed biomass pieces 455 from the biomass processor 404. For example, according to some of the various embodiments, a first feed mechanism may be provided to feed compressed biomass pieces 455 from the densifier 450 to the heated storage container 460. According to aspects of various embodiments, the heated storage container 460 may be configured to provide a suitable enclosure for storing and processing biomass pieces 455. The heated storage container 460 may comprise, for example, a container having insulated walls, one or more gas ports for providing for heating air, a handle configured for carrying the heated storage container, a latching mechanism to attach the container 460 to the mobile platform 400 and/or a release mechanism to disconnect the container 460 from the harvester. The heated storage container 460 may be configured to remove additional moisture content from the biomass pieces 455. Excess compressed biomass pieces 455 may be stored in the heated storage container 460. Additionally, according to some of the various embodiments, the heated storage container 460 may comprise mechanism(s) to discharge biomass to a various location(s). For example, a bidirectional auger and a spring loaded controllable door may be employed to discharge biomass to the various location(s). An additional release mechanism(s) may be employed to remove excess compressed biomass pieces from the harvester. Discharge locations may, in some cases, be pre-determined. In other cases, the discharge locations may be dynamically determined. The harvester may record and/or communicate release locations.

The biomass gasification reactor 470 may be configured to generate syngas 475 by gasifying at least some of the compressed biomass pieces 455 received from the heated storage container 460. Syngas, or synthesis gas, is a fuel gas mixture consisting primarily of hydrogen, carbon monoxide, and very often some carbon dioxide. The name comes from its use as intermediates in creating synthetic natural gas and for producing ammonia or methanol. Syngas is combustible and may be used as a fuel for properly configured internal combustion engines. Additionally, the biomass gasification reactor 470 may generate a first source of heat 471. Heat 471 may be transported, for example, by a heat transport mechanism, to other components of the harvester such as dryer 440 and heated storage container 460.

According to aspects of various embodiments, the biomass gasification reactor 470 may be a down draft type reactor that may be configured to operate with, for example, compressed biomass pieces 455. The compressed biomass pieces 455 may be sized for the biomass gasification reactor 470. For example, some biomass gasification reactor(s) 470 may process biomass pieces 455 with less than a 10 millimeter diameter. The reactor 470 may include a pyrolysis stage, a combustion stage, and/or a reduction stage. Additionally, the biomass gasification reactor 470 may be configured to operate without an internal drying stage and may also include a heat exchanger manifold in the combustion stage. Biomass pieces may be fed to the biomass gasification reactor 470 through a series of mechanisms. For example, a second feed mechanism may be provided to feed heated biomass pieces 465 from the heated storage container 460 to the biomass gasification reactor 470. Example gasifiers may be obtained from All Power Labs of Berkeley, Calif.

The syngas engine 480 may be an internal combustion engine configured to operate on syngas. An internal combustion engine is an engine in which the combustion of a fuel (e.g. syngas and/or fossil fuel) occurs with an oxidizer (usually air) in a combustion chamber that is an integral part of the working fluid flow circuit. According to some of the various embodiments, examples of syngas engine(s) 480 include an internal combustion engine in which combustion is intermittent, such as a multiple-stroke (e.g. 2, 4, 6 stroke engines and/or the like), a rotary engine, and/or the like. According to some other embodiments, the syngas engine 480 may comprise a turboshaft engine. A turboshaft engine is a form of gas turbine which is optimized to produce shaft power rather than jet thrust. Some syngas engines may also be able to operate using other types of combustible fuel(s). Syngas engine 480 may be configured to generate shaft power 485 and/or a second source of heat 481. Heat 481 may be employed by, for example, dryer 440, heated storage container 460, and/or other components on the mobile platform 400. Heat 481 may be transported for example, via a heat exchanger.

The electrical generator 490 may be powered by the shaft power 485 to generate electricity 495 to power the guidance system 402. The electricity may also be employed to power other components on the mobile platform 400 including, but not limited to: control systems, communications devices, conveyors, wheels, cutters, solenoids, cameras, sensors, and/or the like.

According to aspects of various embodiments, the guidance system 402 may be configured to guide the mobile platform as it moves to harvest biomass 405. The guidance system 402 may further include and/or operate with a control system 403. The control system 403 may be functionally integrated with the guidance system 402 or provided separately. The guidance system 403 may deploy navigation signals from a GPS/Glonass and/or the like satellite constellation. The guidance system 402 may communicate with the control system 403 to provide, for example, steering and other types of operation commands to the harvester. Additionally, the control system 403 may further comprise a system for providing telemetry data to a remote system that may be employed to track and record harvesting data and the like. The control system 403 may be a remote control system configured with a communication device to receive remote control commands and to report status to a remote operations control location.

Some embodiments may employ a control system that includes processors, memory, interfaces, specialized hardware, software in combination with processing hardware, and/or the like. The interfaces may be configured to communicate with actuators, sensors, communications equipment, and/or the like. The controller may include application user interfaces. Some of the controllers may include automated vehicle control functionality for braking, stability, suspension, transmission automation, engine operations, mechanical docking, navigation, communications, vision, specialized payloads (e.g. bio-mass processing), remote control, and/or the like.

Figure 5:
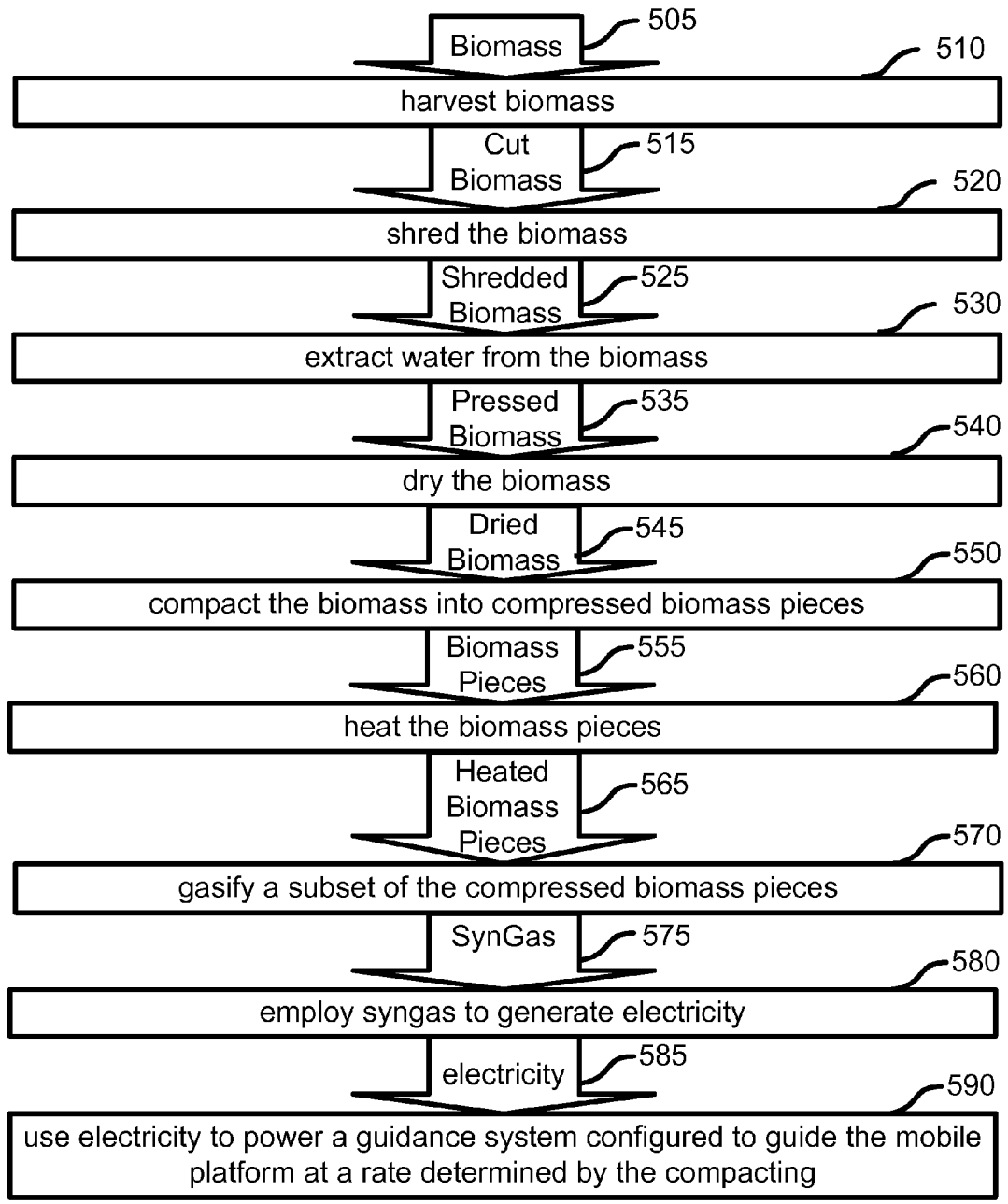
FIG. 5 is a flow diagram of an aspect of mobile platform based biomass powered harvesting as per an embodiment of the present invention.

Some of the various embodiments may be performed, for example, as illustrated in example FIG. 5, as a method for processing biomass 505 on a mobile platform. Biomas may include, but is not limited to: grass, weeds, crops, algae, biological material derived from living organisms, biological material derived from recently living organisms, and/or the like.

The biomass 505 may be harvested at 510. According to some of the various embodiments, the harvesting 510 may include converting biomass 505 into cut biomass 515. The harvesting may employ a cutter, header, and/or the like, several examples of which are described herein above.

The biomass 510 may be shredded at 520 into shredded biomass 525. The shredding may employ a shredder configured to reduce the size of the biomass as well as to break down biomass cell walls and thereby allow moisture to be removed from the biomass.

The shredded biomass 525 may be pressed into pressed biomass 535 to extract water at 530 with a press. According to aspects of various embodiments the press may be, for example, a constant output screw press, a sequential piston-type press, and/or the like.

The pressed biomass 535 may be dried into dried biomass 545 at 540. According to further aspects of various embodiments, the drying may be performed using a dryer such as, for example, a rotary dryer. The dryer may be configured with an electric heating element, a syngas burner, a heat exchanger configured to transport heat from other sources, and/or the like. The construction of the rotary dryer may be further configured to control the moisture content. Additionally, the dryer may be configured to desiccate and/or rotate the biomass. In some embodiments, the dryer may employ an auger configured to move the biomass from a dryer entrance to a dryer exit. The dryer may also include moisture exit(s) and/or opening(s) to allow the exit of moisture while containing the shredded biomass.

The dried biomass 545 may be compacted into compressed biomass pieces 555 at 550. The dried biomass 545 may be compacted at a rate that generates more compressed biomass pieces than required to operate the mobile platform based biomass powered harvester. Maintaining this rate may assure that a surplus of biomass pieces are produced. Compacting may include extruding the biomass into various forms such as pellets, briquettes, and/or the like. Pellet sizes may vary depending upon intended applications and end-use considerations, but may range, for example, between 1 and 100 millimeters in diameter for certain applications or between 5 and 9 millimeters for others. Briquette sizes may vary depending upon the intended application, but may, for example, have a length of between 4 and 300 millimeters.

The biomass pieces 555 may be heated into heated biomass pieces 565 at 560. According to aspects of various embodiments, the heating may employ a heated storage container configured to provide a suitable enclosure for storing and processing produced biomass 555. The storage container may comprise, for example, a container having insulated walls, one or more gas ports for providing for heating air, a handle configured for carrying the heated storage container, a latching mechanism to attach the container to the mobile platform, a release mechanism to disconnect the container from the harvester, and/or the like. The heated storage container may be configured to remove additional moisture content and to store excess compressed biomass pieces 565. Additionally, according to some of the various embodiments, the heated storage container may be configured to discharge biomass pieces. For example, the heated storage container may be configured with a bidirectional auger and a spring loaded controllable door operable to discharge biomass to a suitable predetermined location(s). An additional release mechanism may be provided in some embodiments to remove excess compressed biomass pieces from the harvester.

Some of the heated biomass pieces 565 may be gasified into syngas 575 at 570. According to aspects of various embodiments, the gasification may employ a biomass gasification reactor. The biomass gasification reactor may be, for example, a down draft type biomass gasification reactor. However, one skilled in the art will recognize that other types of biomass gasification reactors may be employed. The biomass gasification reactor may generate heat that may be employed to assist heating, for example biomass pieces. The biomass gasification reactor may be configured to operate with various amounts of biomass pieces, such as, for example, less than a hundred compressed biomass pieces with less than a 10 millimeter diameter. The biomass gasification reactor may further include, according to some of the various embodiments, a pyrolysis stage, a combustion stage, and/or a reduction stage. Additionally, the reactor may be configured to operate without an internal drying stage and may also include a heat exchanger manifold in the combustion stage.

Syngas 575 may be converted to electricity 585 at 580. According to some of the various embodiments, the conversion may include burning syngas in an internal combustion engine to generate shaft power that rotates an electric generator. In these embodiments, the syngas engine may also generate another source of heat that may be used, for example, to heat biomass pieces. According to some of the various embodiments, additional sources of electricity may also be used. For example, before the generator is operating, a battery may be employed as a power source to the harvester to startup and/or initiate mobility before starting the reactor and electronics. Additionally, electricity may be employed to power ventilation equipment to reduce the formation of $CO_2$.

The electricity 585 may be employed to power a guidance system at 590. The guidance system may be configured to guide the mobile platform at a rate determined by the compacting 550.

FIGS. 6A, 6B and 6C are illustrations of an aspect of an embodiment of a mobile platform based biomass powered harvester 600. This example illustration shows a shredder 601, a screw press 602, a dryer 603, a pelletizer/densifier 604, a first pellet conveyor tube 605, a second pellet conveyor tube 606, a reactor 607, a cyclone ash separator 608, a secondary heat exchanger 609, an engine 610, a clutch control 611, a power transmission 612, an engine starter/alternator 613, an engine heat shroud blower 614, an engine heat shroud 615, a screw press heat shroud and an engine filter & gas mixer 617. This configuration is being shown as an example only as many other embodiments are possible. This embodiment includes several components that are optional with respect to practicing the claimed embodiments. For example, embodiments maybe configured without specifically employing first pellet conveyor tube 605, second pellet conveyor tube 606, cyclone ash separator 608, secondary heat exchanger 609, clutch control 611, power transmission 612, engine starter/alternator 613, engine heat shroud blower 614, engine heat shroud 615, screw press heat shroud and/or engine filter & gas mixer 617. Similarly, some components may be substituted for some of the components. For example, pellet conveyor tube 605, and/or second pellet conveyor tube 606 perform a transport function of pellets. One skilled in the art will recognize that pellets may be transported using other mechanisms such as conveyers, pneumatics, gravity drops, and/or the like.

Shredder 601 may be configured to shred biomass material into small pieces. The biomass material may be fed to the shredder from a header via a transport mechanism such as a crop elevator. A drum shredder is shown but other implementations such as a segmented auger are possible. Output from the shredder may be dropped into a screw conveyor for transport to a press such as a screw press 602.

Screw press 602 may be configured similar to a screw conveyor with pressures generated from a widening taper on the screw threads. This pressure may lead to removal of water from the shredded material. The water removal may be aided by heat conveyed from reactor heat exchanger through a heat shroud. The output of the screw press 602 may be a press cake. The press cake may be conveyed to the dryer 603 through a tube. Typical screw press input moisture range may be between 40% and 90% by dry mass basis. Exit moisture content may be expected to be in the approximate range of 40% to 55%. So, for example, screw press 602 may be configured to press biomass with a moisture content greater than 7% of mass. However, different moisture content may be expected depending upon the exact configuration of the header, shredder 601, screw press 602 and the biomass being processed.

Rotary dryer 603 may accept the press cake from the screw press 602 and heated airflow from the engine 610. The dryer 603 may further reduce the moisture content of the press cake from, for example, 40% moisture to, for example, approximately 10% to 20% moisture. The press cake may be broken up and tumbled through the dryer while the hot air from the engine 610 dries the material. The press cake may break up as it dries and run through the tumbling action of the dryer 603. The dried material may be extracted to the pelletizer 604. The air exit from the dryer 603 may be covered by a screen that is automatically wiped by the rotary action of the dryer 603.

Pelletizer 604 may be configured to compress the dried material into pellets with an internal rotary pressing function. Pellets may be stripped by an integrated cutter and fall into a conveyor tube. The pelletizer 604 may employ friction heat from the process to increase operating temperature and assist functionality.

Pellet conveyor tube 605 may be configured to convey produced pellets from the pelletizer 604 to a pellet bin. The pellet conveyor tube 605 may be configured to dump pellets before they reach the pellet bin. This functionality may be used, for example, when the pelletizer 604 is still cold and producing poor pellets. Normal pellets may be conveyed to the bin where they may be progressively dried through a first-in, first-out process.

A second pellet conveyor tube 606 may be configured to transport dried pellets from the pellet bin to reactor 607. A gas purge supply from the engine exhaust may be employed to prevent oxygen from the pellet bin from entering the reactor 607 and to prevent reactor gasses from moving into the pellet bin through this tube 606.

Reactor 607 may be configured to convert pellets to SynGas. SynGas is a combination of carbon monoxide and hydrogen gas. The reactor 607 may also employ an internal primary heat exchanger to reduce the amount of reaction heat leaving the reactor.

The fuel gas mixture exiting the reactor will have a small level of ash contamination. According to some of the various embodiments, a cyclone ash separator 608 may be configured to remove this ash from the fuel stream. Additionally and/or alternatively, a bypass valve (not shown) may also be employed to prevent tar from a reactor cold start from entering the cyclone separator.

A secondary heat exchanger 609 may be configured to remove heat and moisture from the fuel stream. Moisture may also (and/or alternatively) be dumped via a line valve (not shown) at an exit connection.

Engine 610 may be employed to convert fuel to shaft power and heated air. Examples of engines include 2-cycle and 4-cycle, single or multiple cylinder internal combustion engines, turbo-shaft engines, and/or the like. Some engines may be air-cooled.

Clutch control 611 may be configured to engage a process drive on an external control input. This may enable the engine to be started without the loads from the rest of the system being connected. Clutch control 611 may be an electrically actuated unit. Power transmission 612 may be configured to connect the engine 610 to the mechanical loads. Some of the various illustrated embodiments employ pulleys and belts, however other types of transmissions such as direct drive, variable and/or geared transmissions may be employed. Engine starter/alternator 613 may be configured to start the engine 610 and/or provide electrical power from engine 610 when needed. Engine starter/alternator 613 may be single or multiple phase and employ brushes or be brushless. For example, starter/alternator 613 may be, according to some of the various embodiments, a 3-phase brushless DC motor with appropriate electronics.

An engine heat shroud blower 614 may be configured to push air past engine 610 for cooling. The heated air may be transported to, for example, dryer 603 to assist in drying the biomass or to, for example, a pellet bin. Engine heat shroud 615 may be configured to control the cooling airflow around, for example, engine 610 and/or deliver heated air to dryer 603. Screw press heat shroud may focus heated air from the secondary heat exchanger on a section of the screw press 602. Engine filter & gas mixer 617 may be configured to remove fuel contaminants. For example, in the currently illustrated embodiment, the cyclone ash separator 608 may allow some contaminants to pass. In this example, the engine filter & gas mixer 617 may be configured to remove fuel contaminants not removed by cyclone ash separator 608. Additionally, engine filter & gas mixer 617 may be configured to mix atmospheric oxygen with fuel gas in a manner similar to a carburetor.

Figure 7A:
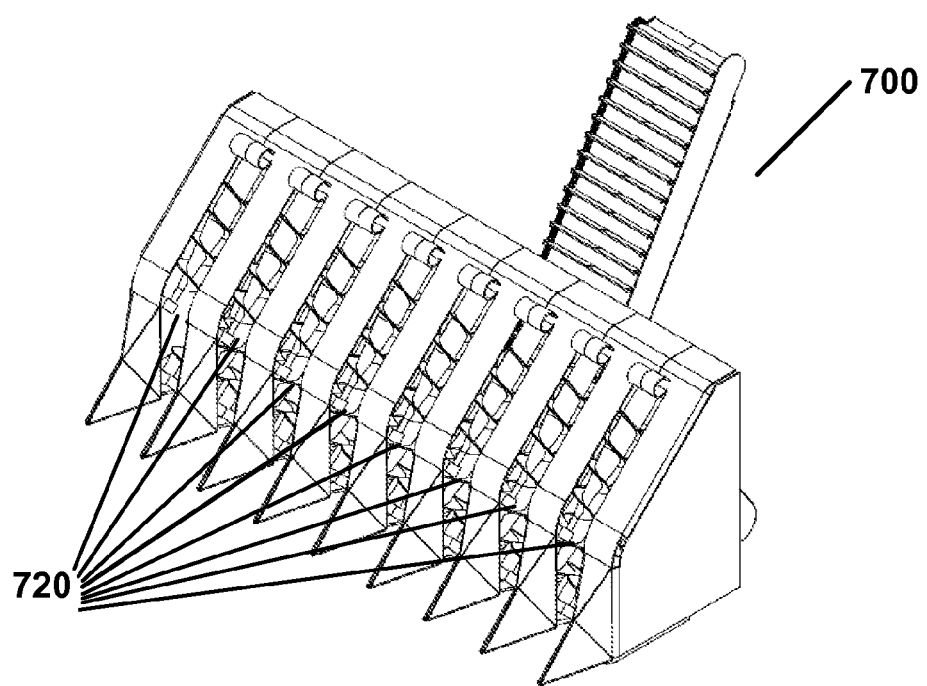
FIGS. 7A and 7B are illustrations of an example header as per an aspect of an embodiment of the present invention.
Figure 7B:
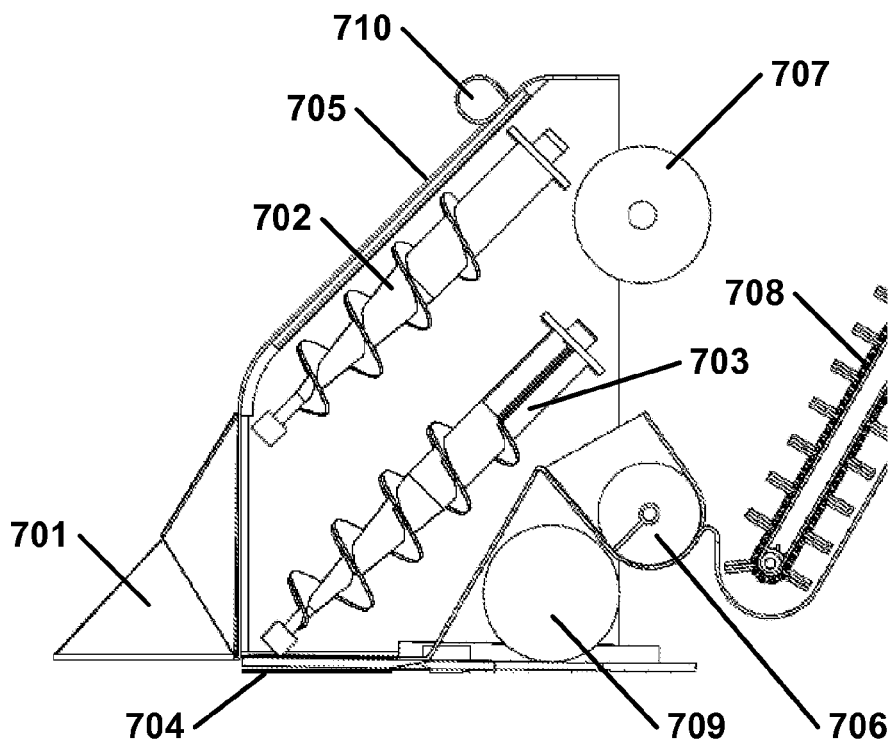

FIGS. 7A and 7B are illustrations of an example header as per an aspect of an embodiment of the present invention. A header 700 may be configured to be mounted on a forward side of a mobile platform based biomass powered harvester to harvest and/or deliver cut crop pieces to a biomass processor. As illustrated in this example embodiment, header 700 includes a crop snout 701, a feed and alignment roll 702, a snap roll 703, a cutter bar 704, an outer case and guide 705, a header auger 706, a feed roll and snap roll drive motor 707, a crop elevator 708, a cutter bar and conveyer drive motor 709, and a crop bumper 710. The crop snout 701 and crop bumper 710 may be configured to direct the crop into one of a series of slots 720 while the header moves through, for example, a field of crops. The crop may then meet a cutter bar 704 configured to cut the crop at the base. The cut pieces of crop may then be transported internally through the header by feed and alignment roll 702 and snap roll 703. The feed and alignment roll 702 and snap roll 703 may be powered by feed roll and snap roll drive motor 707. Snap roll (sometimes referred to a knife roll) may cut, snap, crimp, and/or condition stalks and other bio-materials so that it may be fed by header auger 706 onto crop elevator 708. Crop elevator 708 may transport the cut and snapped crop pieces for further biomass processing. Cutter and conveyor drive motor 709 may power the cutter bar 704 and/or conveyer mechanisms (such as header auger 706 and crop elevator 708). Feed roll and snap roll drive motor 707 and cutter and conveyor drive motor 709 may be independent motors, combined motors, and/or mechanical linkages to external shaft power.

FIGS. 8A, 8B and 8C are illustrations of an example shredder/press as per an aspect of an embodiment of the present invention. As illustrated, the example shredder press 800 includes shredder casing 801, shredder bearing plates 802, shredder shafts 803, spacer wheel 804, shredder wheel 805, stripper plate 806, collection auger 807, collection auger case 808, press auger case 809, press auger case 810, press auger case 811, press auger 812, liquid containment case 813, heater cowl 814, extruder 815, transmission 816, and/or transmission input 817.

Shredder casing 801 may be configured to hold the shredder bearing plates 802 together, mechanically connect the shredder 800 to the collection auger case 808 and serves as a funnel for both the material entering the shredder 800 and exiting the shredder 800. The casing may be composed of a number of components configured to allow disassembly. Shredder bearing plate 802 may be configured to hold bearings for the shredder shafts together. Shredder shafts 803 may be configured to hold and rotate the shredder wheels 805 during loaded and unloaded conditions, for example, when experiencing high side loads. Spacer wheel(s) 804 may be configured to set separation distance(s) between adjacent shredder wheel(s) 805. Shredder wheel(s) 805 may be configured to cut incoming material and push the incoming material through collection auger 807. Stripper plate(s) 806 may be configured to help remove cut material from shredder wheel(s) 805.

Collection auger 807 may be configured as a conveyor to collect shredded bio-material coming out of the shredder and push the collected bio-material into a tube connecting to the press auger 800. According to some of the various embodiments, the conveyor and press components may be combined on a single shaft. For space constrained vehicle applications, the conveyer and press components may be separated. According to some of the various embodiments, collection auger 807 may have a milled shaft. However, those skilled in the art will recognize that other configurations are possible, such as employing a helical strip welded to a shaft. Collection auger case 808 may be configured, for example, as a tube with openings to hold collection auger 807. The openings may be configured to allow shredded bio-material from the shredder to enter from the top. Additional openings may be configured on the bottom of the collection auger case 808 for the collected material to enter the press auger 800. Press auger case 809 may be, for example, a high strength tube that contains the press auger. Press auger case liquid vents 810 may include holes or slits that cut into the side of the press auger case 810 that allow liquid to escape during the pressing operation.

Press auger case reinforcement 811 may add additional reinforcement for the press auger case to withstand press pressures that occur when used with slits for liquid vents. According to some of the various embodiments, a spring-like helical wound wire may be welded to the outside of the case to provide additional strength.

The press auger 812 may be a shaft with a widening taper helical pattern cut into it. As the taper widens, the shredded bio-material may be pushed with progressively increasing force against the case. This press action may be configured to force liquid water out of the shredded bio-material. Liquid containment case 813 may be configured to direct water ejected from the pressed bio-material into a single exit hole. Heater cowl 814 may be configured to focus a high-temperature input air stream onto the end of the press chamber so that the high-temperature input air stream may improve the removal of liquid during pressing.

Extruder cap 815 may be configured to create back pressure at the end of the press auger 812. The opening diameter may determine the pressure of the system. An exit conveyor tube may be mounted to the extruder to take the pressed material to the next processing component, typically a dryer. Transmission 816 may be configured to hold the mechanical gearing to drive the shredder shaft(s) 803, the collection auger 807, and the press auger 812. The example illustration shows the input shaft connecting directly to the press auger 812. However this is only for illustrative purposes and alternative configurations are anticipated. The input 817 to the transmission may be driven a number of different ways, including, for example, a pulley (as illustrated), gear(s), sprocket(s), and/or the like.

FIGS. 9A, 9B, 9C, 9D, and 9E are illustrations of an example pelletizer 900 as per an aspect of an embodiment of the present invention. Example pelletizer 900 is a type of densifier configured to generate pellets. The illustrated example pelletizer 900 includes a pelletizer wheel 901, a traction wheel 902, a traction wheel bearing(s) 903, an outer case 904, a traction wheel wall 905, side bearing(s) 906, height adjustment ring(s) 907, side plate(s) 908, and/or loading port 909.

Pelletizer wheel 901 may be configured as an interior rolling component through which bio-material is forced to create pellets. A number of tapered holes may be configured through the axis that may not, according to some of the various embodiments, intersect the axis of rotation, and may be offset to prevent pellets from intersecting each other during the extrusion process. Bio-material pinched between the outer face of the pelletizer wheel 901 and traction wheel 902 may be forced through the holes under pressure to form pellets. Traction wheel 902 may be configured to rotate with the pelletizer wheel 901. Ridges cut into the surface of traction wheel 902 may help prevent bio-material from slipping past pelletizer wheel 901. Traction wheel 902 may be configured to ride on roller bearings. Traction wheel bearings 903 may be configured as high-load roller bearings to allow rotation between the traction wheel 902 and the outer case 904. Outer case 904 may be configured as a high stiffness component with a polished internal bearing surface. A threaded outer surface may be configured for side plate 908 mounting. Traction wheel wall 905 may be configured as a side wall to prevent press material from leaving through the side of the pelletizer wheel 901. Side bearings 906 may be configured to support the rotation of the pelletizer wheel 901 against the side plates 908. Height adjustment ring 907 may be configured as a ring with a hole axis that is not concentric with the outer edge axis. Rotating the height adjustment ring 907 during assembly may adjust the clearance of the face of the pelletizer wheel 901 over the traction wheel 902. Side plates 908 may be configured to transmit the compression load between the pelletizer wheel 901 and the outer case 904. Loading port 909 may be configured as a hole in the side walls to allow material to enter the space between the pelletizer wheel 901 and traction wheel 902.

FIGS. 10A and 10B are illustrations of an example biomass gasification reactor 1000 as per an aspect of an embodiment of the present invention. Biomass gasification reactor 1000 may be configured to generate syngas by gasifying biomass pellets. The illustrated example embodiment of a biomass reactor 1000 includes a fuel port 1001, a fuel port adapter 1002, pyrolyzer cap 1003, hearth (flange) 1004, a hearth (combustion zone) 1005, a hearth reduction zone 1006, a number of tuyeres 1007, a hearth sheath 1008, a reactor outer wall 1009, a primary heat exchanger 1010, a fuel grate 1011, grate fasteners 1012, an ash port 1013, an ash port adapter 1014, and an ash auger 1015.

The fuel port 1001 may be where pelletized fuel enters the reactor 1000. In downdraft gasifier designs, there are generally considered to be four zones: a drying zone, a pyrolysis zone, a combustion zone, and a reduction zone. In some gasifiers, the drying zone may be adjacent to the pyrolysis zone. According to some of the various embodiments, the drying zone may be located in the physically separate pellet bin and the top of the reactor 1000 may be configured to start with the pyrolysis zone. Fuel port adapter 1002 may be configured to adapt fuel port 1001 to the delivery method used to get biomass pellets from a pellet bin to the reactor 1000. In some of the various embodiments, the delivery method may be a tube. A positive-pressure gas flood system (not shown) may be routed from the engine exhaust to prevent atmospheric oxygen from the pellet bin from travelling to the reactor 1000, and to prevent pyrolyzed gasses from leaving the reactor 1000 which could potentially tar a fuel delivery tube. The pyrolyzer cap 1003 may be configured to allow the fuel port to be disconnected from the rest of the hearth for cleaning and service. Alternatively, some of the various embodiments may be configured with a one-piece inner hearth.

Hearth flange 1004 may be configured to connect the pyrolyzer cap 1003, the hearth 1005, and reactor outer wall 1009 components. High temperature gaskets may be disposed between these components. The hearth 1005 is the combustion zone of the reactor 1000. The hearth combustion zone 1005 wall may be configured to constrict the fuel flow as an inverted cone. The final diameter of the hearth combustion zone 1005 may be called the throat diameter, and may be a design parameter of the system that determines performance. According to some of the various embodiments of the reactor 1000, the hearth combustion zone 1005 wall, reduction zone 1006 wall, and hearth sheath 1008 wall may be connected together forming an air manifold. Combustion flow control ports called tuyeres 1007 may be mounted in the combustion zone wall providing oxygen to the fuel reaction.

The hearth reduction zone 1006 may be configured with a hearth reduction zone 1006 wall to allow the heat of combustion to continue reducing the solid fuel to gas components. The hearth reduction zone 1006 wall may permit the spreading of this fuel in an organized way. The combustion flow control ports called tuyeres 1007 may be mounted in the combustion zone 1005 wall providing oxygen to the fuel reaction. The cross-sectional opening of the tuyeres 1007 may be an engineered performance parameter.

The hearth sheath 1008 may be configured as a mechanical wall to separate the air manifold from the primary heat exchanger coil 1010. The fuel grate 1011 may also, according to some of the various embodiments, be mounted to the sheath.

The reactor outer wall 1009 may be configured to separate the primary heat exchanger 1010 and the reaction area from the atmosphere. The reactor outer wall 1009 may be configured to form part of the flow barrier for the heat exchanger 1010 and mechanically connect the ash port 1013 to the hearth. The primary heat exchanger 1010 may, according to some of the various embodiments, be configured as a tube that wraps around the hearth sheath. The primary heat exchanger 1010 may be configured to exchange heat between an incoming cooler oxidizer air stream with the outgoing hot fuel stream. The inlet end of the primary heat exchanger 1010 may be welded to the hearth flange 1004. The output end of the primary heat exchanger 1010 may be welded to a hole in the sheath wall leading to the air manifold.

Fuel grate 1011 may be configured as a perforated sheet allowing gasses and ash to pass but preventing solid fuel pellets from passing. The grate 1011 may be configured to attach to the sheath wall with fasteners. Grate fasteners 1012 may be configured to attach the fuel grate 1011 to the hearth sheath. Ash port 1013 may be configured to allow ash to leave the reactor 1000. Ash may fall through the fuel grate 1011 by force of gravity and fall through the ash port 1013. Ash port adapter 1014 may be configured to adapt the ash port 1013 to the extraction method used for removing ash from the reactor 1000. According to some of the various embodiments, the ash port adapter 1014 may include a tube with an ash auger 1015. Ash auger 1015 may be configured to remove ash from the reactor 1000. The ash auger 1015 may be configured with a shaft that has a spring-loaded plug that prevents oxygen from entering the reactor 1000 while allowing ash to be pulled out.

In this specification, "a" and "an" and similar phrases are to be interpreted as "at least one" and "one or more." References to "an" embodiment in this disclosure are not necessarily to the same embodiment.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) harvesting and processing biomass such as grass from field into fuel pellets. However, one skilled in the art will recognize that embodiments of the invention could be vary in many aspects both functionally and structurally.

For example, the ground based mobile platform could be configured as an amphibious, water surface, or submersible craft to harvest biomass such as marsh grass, wild algae, kelp, cyanobacteria, and/or the like. The harvesting of plant based biomass could be extended to the harvesting and processing of non-plant sources such as plankton.

Another variation includes a biomass powered harvester that may be configured to only harvest for their own energy and do not produce fuel for external use. Examples may include biomass-powered scout or sensor vehicles, or transport vehicles with a built-in grazing fuel function.

According to some of the various embodiments, the biomass powered harvester may be configured to harvest biomass for energy to supply a service such as earth moving, selective species eradication, planting, replanting, pest control, and/or the like. According to yet other embodiments, the biomass powered harvester(s) may be configured such that a team of vehicles are employed where components of the process are separated between team members. For example, a tree-climbing vine cutter that does not have onboard densification functions may be configured to collaborate with a ground-based vine processor that does not have tree climbing functions. Another example is a submersible collecting robot working with a surface vessel that processes to fuel.

It is envisioned that embodiments of the present invention may include a vehicle that harvests from biomass, but includes further processing. Examples of further processing may include, for example, processing to liquid hydrocarbons or other chemicals, plastics, fiber products including carbon fibers, and/or the like.

Some of the various embodiments may be configured as a vehicle that harvests biomass, but produces a non-physical product such as shaft power for power take-off, or electrical power. Embodiments may be configured as a docking power take off (PTO) power generator that could become a microgrid power generation node when not harvesting. A power take-off or power takeoff (PTO) is when power is taken from a power source, such as a running engine, and transmitting the power to an application such as an attached implement or separate machines. The PTO may comprise a splined output shaft on the vehicle so that a PTO shaft, a kind of drive shaft, may be connected and disconnected to another device which may utilize the shaft power for uses such as generating electricity. In other words, the PTO may draw energy from the engine.

Additionally, embodiments may be configured to process biomass internally for a soil-enriching product such as biochar or other fertilizer. Other embodiments may be configured to generate multiple biomass formats, such as producing both pellets and briquettes. Yet other embodiments may be configured to scavenge (and/or seek) pre-processed fuel sources such as municipal waste or tires to be harvested and converted into fuel. Some of the various embodiments may be configured to use biomass as fuel, but produce a non-biomass output product. For example, an embodiment may be configured that uses biomass as fuel but produces a second unrelated product such as a municipal waste robot that use waste for energy but produces densified blocks of metals, or a cotton harvesting robot that produces spools of cotton.

It is also envisioned that embodiments may be configured as retro-fits for vehicles that impart the described harvesting/processing functions to existing vehicles.

In addition, it should be understood that any figures that highlight any functionality and/or advantages, are presented for example purposes only. The disclosed architecture is sufficiently flexible and configurable, such that it may be utilized in ways other than those shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A mobile platform based grass powered harvester comprising:
   a) a cutter to cut grass;
   b) a grass processor comprising:
      i) a shredder to convert the cut grass into shredded grass;
      ii) a press to extract water from the shredded grass to produce pressed grass;
      iii) a dryer to generate dried grass from the pressed grass; and
      iv) a pelletizer to compact the dried grass into a multitude of grass pellets;
   c) an heated storage container to store the grass pellets;
   d) a chemical reactor configured to:
      i) generate syngas by gasifying at least some of the grass pellets; and
      ii) generate a first source of heat;
   e) a guidance system configured to guide the mobile platform at a speed determined by the operating capacity of the pelletizer;
   f) a syngas engine configured to:
      i) generate shaft power; and
      ii) generate a second source of heat; and
   g) an electrical generator powered by the shaft power and configured to power at least the guidance system.

2. The mobile platform based grass powered harvester of claim 1, further including a heat transfer element to transport heat from the syngas engine to the dryer and heated storage container.

3. The mobile platform based grass powered harvester of claim 1, wherein the dryer is a rotary dryer.

4. A mobile platform based biomass powered harvester comprising:
   a) a header to harvest biomass;
   b) a biomass processor comprising:
      i) a shredder to shred the biomass;
      ii) a press to extract water from the biomass;
      iii) a dryer to dry the biomass; and
      iv) a densifier to compact the biomass into a multitude of compressed biomass pieces;
   c) an heated storage container to receive compressed biomass pieces from the biomass processor;
   d) a guidance system configured to guide the mobile platform at a speed determined by the operating capacity of the densifier;
   e) a biomass gasification reactor to:
      i) generate syngas by gasifying at least some of the compressed biomass pieces received from the heated storage container; and
      ii) generate a first source of heat;
   f) a syngas engine configured to:
      i) generate shaft power; and
      ii) generate a second source of heat; and
   g) an electrical generator powered by the shaft power and configured to power at least the guidance system.

5. The mobile platform based biomass powered harvester of claim 4, wherein the densifier is one of the following:
   a) a pelletizer;
   b) a briquetter; and
   c) an extruder.

6. The mobile platform based biomass powered harvester of claim 4, further including a battery.

7. The mobile platform based biomass powered harvester of claim 4, wherein the header includes at least one of the following:
   a) a frame;
   b) a cutter bar;
   c) a crushing roll;
   d) a pickup cylinder;
   e) a pickup reel;
   f) a conveyer;
   g) an auger;
   h) a vacuum;
   i) a slicer;
   j) tines;
   k) a rake bar;
   l) an impeller; and
   m) a pickup device.

8. The mobile platform based biomass powered harvester of claim 4, wherein the biomass includes at least one of the following:
   a) grass;
   b) weeds;
   c) crops;
   d) algae;
   e) biological material derived from living organisms;
   f) biological material derived from recently living organisms; and
   g) man-made waste materials.

9. The mobile platform based biomass powered harvester of claim 4, wherein the dryer is a rotary dryer.

10. The mobile platform based biomass powered harvester of claim 4, wherein the shredder is configured to reduce the size of the biomass to be compatible with the densifier.

11. The mobile platform based biomass powered harvester of claim 4, wherein the press is configured to press biomass with a moisture content greater than 7% of mass.

12. The mobile platform based biomass powered harvester of claim 4, wherein the dryer comprises at least one of the following:
   a) an electric heating element;
   b) a syngas burner;
   c) a heat exchanger configured to transport at least one of the following into the rotary dryer:
      i) the first source of heat; and
      ii) the second source of heat.

13. The mobile platform based biomass powered harvester of claim 4, wherein the rotary dryer is configured to rotate the biomass using an auger.

14. The mobile platform based biomass powered harvester of claim 4, wherein the rotary dryer is configured to move the biomass from a dryer entrance to a dryer exit.

15. The mobile platform based biomass powered harvester of claim 4, wherein the densifer is configured to compact the shredded biomass at a rate that generates more compressed biomass pieces than required to operate the mobile platform based biomass powered harvester.

16. The mobile platform based biomass powered harvester of claim 4, wherein the densifer extrudes the shredded biomass into the pellets.

17. The mobile platform based biomass powered harvester of claim 4, wherein the heated storage container comprises at least one of the following:
   a) a container with insulated walls;
   b) one or more gas ports;
   c) a handle for carrying the heated storage container;
   d) a latching mechanism to attach the container to the mobile platform; and
   e) a release mechanism to disconnect the container from the mobile platform.

18. The mobile platform based biomass powered harvester of claim 4, wherein the heated storage container is configured to store excess compressed biomass pieces.

19. The mobile platform based biomass powered harvester of claim 4, wherein the heated storage container comprises a release mechanism to remove compressed biomass pieces from the mobile platform based biomass powered harvester.

20. The mobile platform based biomass powered harvester of claim 4, further including a remote controlled control system.

\* \* \* \* \*